(No Model.)
G. D. BURTON.
DISTRIBUTING APPARATUS FOR HEATING CURRENTS.
No. 475,179. Patented May 17, 1892.
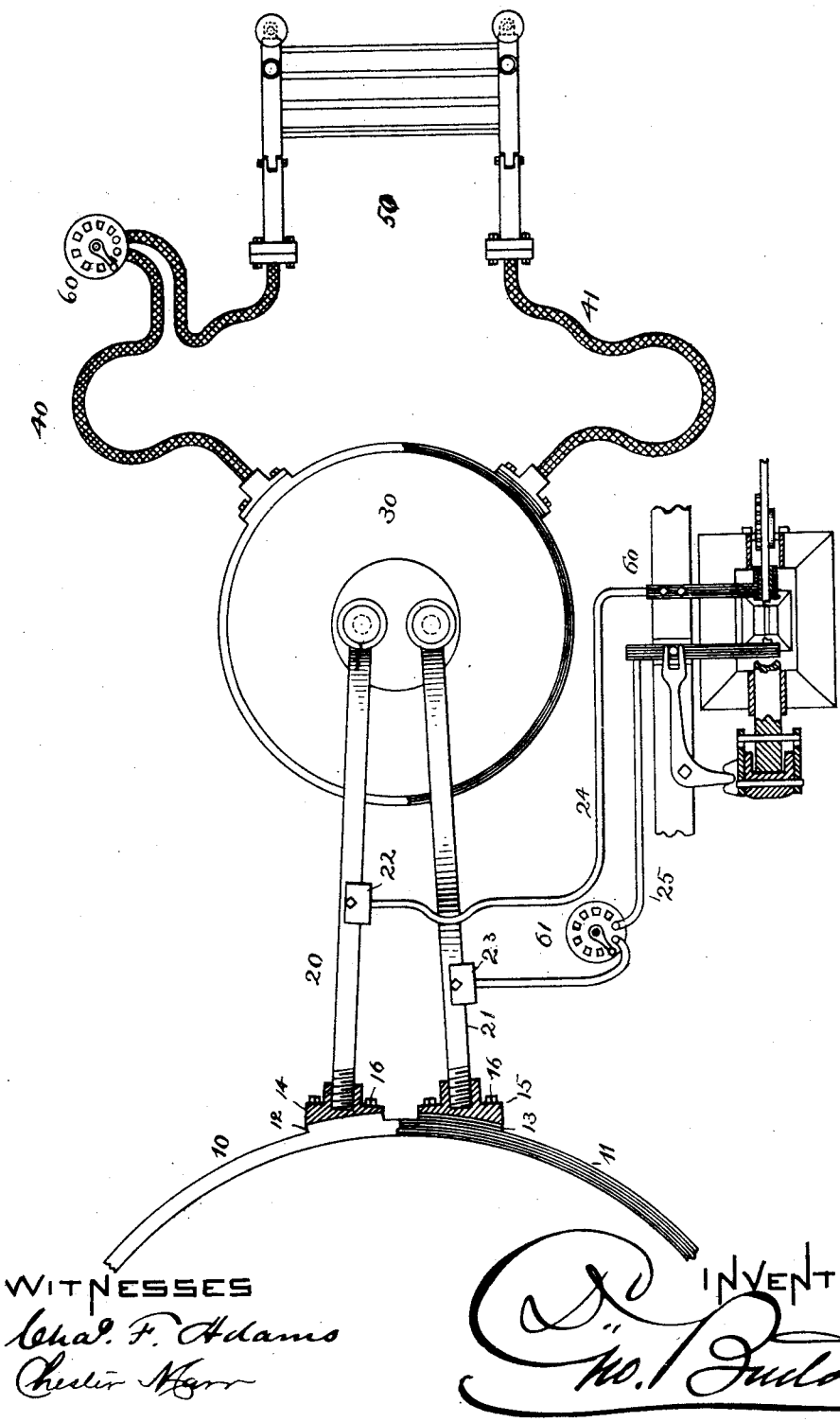
WITNESSES
Chas. F. Adams
Chester Narr
INVENTOR
Geo. D. Burton

UNITED STATES PATENT OFFICE.

GEORGE D. BURTON, OF BOSTON, MASSACHUSETTS, ASSIGNOR TO THE ELECTRICAL FORGING COMPANY, OF MAINE.

DISTRIBUTING APPARATUS FOR HEATING-CURRENTS.

SPECIFICATION forming part of Letters Patent No. 475,179, dated May 17, 1892.

Application filed May 14, 1891. Serial No. 392,705. (No model.)

*To all whom it may concern:*

Be it known that I, GEORGE DEXTER BURTON, a citizen of the United States, residing at Boston, in the county of Suffolk, in the State of Massachusetts, United States of America, have invented certain new and useful Improvements in Systems of Electrical Distribution of Heating-Currents, of which the following is a specification.

The object of this invention is to distribute heating-currents of electricity of different volumes for heating metals for forging or other purposes.

The drawing represents a plan of an apparatus embodying this improved system of electrical distribution.

This apparatus embraces a primary current-converter and a secondary current-converter. Each of these converters, as shown in this apparatus, consists of an annular core composed of different lengths of uninsulated or partially-insulated wire, said lengths being arranged side by side and breaking joints at various intervals in the core, primary circuit-coils composed of comparatively fine wire and surrounding the said core at intervals, secondary coils composed of sheets or plates of copper surrounding said core between the primary coils and insulated therefrom, two exterior copper rings disposed around the structure, the positive terminals of all the secondary coils being connected to one of said rings and the negative terminals of said secondary coils being all connected to the other of said rings, said rings thus constituting the positive and negative terminals of the converter, as hereinafter described. The primary coils are arranged in pairs, the coils of each pair being in series with each other and in parallel with every pair. The secondary coils are connected to the rings in parallel or multiple arc.

The positive ring 10 and negative ring 11 of the primary converter are disposed in different planes, one above the other. This converter is connected in any suitable manner with a suitable source of electricity—such as an alternating-current dynamo—from which it receives the current to be converted. These rings are composed of copper, or other suitable conductive material and provided with bosses 12 and 13, to which screw-threaded sockets 14 and 15, also composed of conductive material, are attached by bolts 16 or other means. Conductors, preferably in the form of rods 20 and 21, composed of copper or other suitable conductive material, are connected at their inner ends with these sockets and at their outer ends with the terminals of a secondary converter 30.

The primary converter reduces the intensity and increases the volume of the current, and the secondary converter still further reduces its intensity and increases its volume.

The secondary converter is connected by means of flexible cables 40 and 41 or other suitable conductors with an electric-heater 50.

The rods 20 and 21 are provided with sliding clamps 22 and 23, and conductors 24 and 25 are connected at their inner ends to said clamps and at their outer ends to any suitable electric metal-working apparatus, the apparatus illustrated in the drawings being similar to that shown in my patent, No. 435,110, dated August 26, 1890.

In the use of this apparatus, currents may be taken off at different points and supplied at the same time to the different machines in the volumes required by each.

If desired, rheostats 60 and 61 may be interposed in the branch circuits.

I claim as my invention—

1. In an apparatus for distributing electric currents for heating purposes, the combination of a current-converter provided with exterior rings constituting the positive and negative poles, a secondary current-converter provided with exterior rings constituting the positive and negative poles, conductors connecting the primary with the secondary converter, an electric heater, and conductors connecting the rings of the secondary converter with said heater.

2. In an apparatus for distributing electric currents for heating purposes, the combination of a current-converter provided with exterior rings constituting the positive and negative poles, a secondary current-converter provided with exterior rings constituting the positive and negative poles, conductors connecting the primary with the secondary converter, an electric heater, and flexible conductors connecting the rings of the secondary converter with said heater.

3. In an apparatus for distributing electric currents for heating purposes, the combination of a current-converter provided with exterior rings constituting the positive and negative poles, a secondary current-converter provided with exterior rings constituting the positive and negative poles, conductors connecting the primary and secondary converters, clamps adjustable on said conductors, an electric heater, and conductors connecting said heater with said clamps.

4. In an apparatus for distributing electric currents for heating purposes, the combination of a current-converter provided with exterior rings constituting the positive and negative poles, a secondary current-converter provided with exterior rings constituting the positive and negative poles, conductors connecting the primary with the secondary converter, an electric heater, clamps adjustable on said conductors, a second electric heater, and conductors connecting said heaters with said clamps.

GEO. D. BURTON.

Witnesses:
CHESTER MARR,
E. F. PHILIPSON.